United States Patent [19]
Belart et al.

[11] 3,995,652
[45] Dec. 7, 1976

[54] DIRECTIONAL CONTROL VALVE

[75] Inventors: Juan Belart, Walldorf, Germany; Leo Vermeyen, Kontich; Pieter van den Eynden, Ranst, both of Belgium

[73] Assignee: ITT Industries, Inc., New York, N.Y.

[22] Filed: June 6, 1975

[21] Appl. No.: 584,680

[30] Foreign Application Priority Data

July 24, 1974 Germany .................. 2435569

[52] U.S. Cl. .................. 137/102; 137/116.3; 137/625.65
[51] Int. Cl.² .................. F15B 13/044
[58] Field of Search .................. 137/85, 102, 116.3, 137/625.65

[56] References Cited
UNITED STATES PATENTS

| | | | |
|---|---|---|---|
| 3,267,965 | 8/1966 | Kroffke | 137/625.64 |
| 3,698,435 | 10/1972 | Evans | 137/625.69 X |
| 3,749,128 | 7/1973 | Sallberg et al. | 137/625.65 X |
| 3,807,441 | 4/1974 | Grosseau | 137/85 X |
| 3,815,633 | 6/1974 | Greenwood et al. | 137/625.27 |

FOREIGN PATENTS OR APPLICATIONS

| | | | |
|---|---|---|---|
| 1,240,632 | 4/1960 | France | 137/625.65 |
| 974,907 | 11/1964 | United Kingdom | 137/116.3 |

*Primary Examiner*—Alan Cohan
*Assistant Examiner*—Gerald A. Michalsky
*Attorney, Agent, or Firm*—John T. O'Halloran; Alfred C. Hill

[57] ABSTRACT

A solenoid operated 3-way, 2-position directional control valve for use in an antiskid regulation system includes an armature controlled by a solenoid and is firmly connected to a valve spool movable in a bore. The valve spool enables an outlet port to wheel brake cylinders to communicate with a fluid source (master cylinder) or a reservoir. The valve spool is actuated by the pressure at the outlet port in the direction of the solenoid and in opposite direction by the pressure of the fluid source such that the valve spool assumes an intermediate equilibrium position between its two normally open and normally closed positions. In this equilibrium position the outlet port is blocked from both the fluid source and reservoir.

4 Claims, 1 Drawing Figure

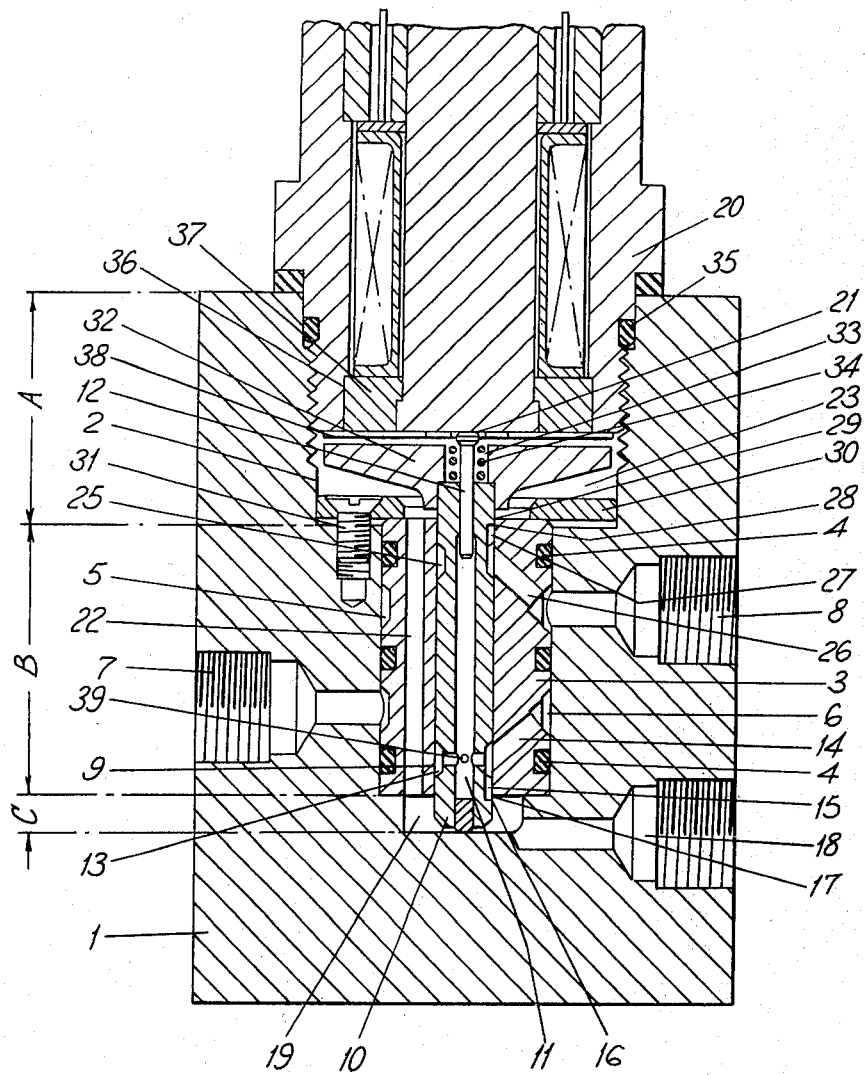

DIRECTIONAL CONTROL VALVE

BACKGROUND OF THE INVENTION

This invention relates to a solenoid operated 3-way, 2-position directional control valve, and in particular such a valve for an antiskid regulation system comprising an armature which is controlled by a solenoid and is firmly connected to a valve spool movable in a bore with the valve housing such that the valve spool enables an outlet port to communicate with a fluid source or with a return-reservoir connector.

Such a 3-way, 2-position directional control valve is known from the U.S. Pat. No. 3,144,047. This valve, however, can only take two certain positions. When the magnet coil is de-energized, the valve spool is held in one of the end positions distant from the magnet by the force of a spring, with one of the flow passages being opened, while when the magnet coil is energized, the valve spool is shifted into the other end position in which the other flow passage is opened. These two positions are completely independent of the pressures at the different connectors or flow passages.

In many applications, in particular in antiskid regulation systems, it is necessary that a certain pressure be adjusted at the outlet port. From the German Patent DT-PS 1,203,623, an antiskid regulation system is known in which the effective brake pressure is regulated with a solenoid operated 3-way, 2-position directional control valve. The antiskid regulation system disclosed therein is to serve hereinafter as an example of the problems occurring when a pressure is regulated with such a valve. In the example of an antiskid regulation system, the pressure of a fluid source is delivered to the wheel brakes of an automotive vehicle via the 3-way, 2-position directional control valve. If it is ascertained by a controller that the brake pressure at the wheel brakes is too high, the magnet coil of the 3-way, 2-position directional control valve will be energized and the valve spool will be shifted in such a way that the outlet port will be connected with the return-reservoir connector and that the connector of the fluid source will be closed. In this manner, fluid flows from the wheel brakes to the return reservoir so that the pressure effective at the wheel brakes is reduced. If the 3-way, 2-position directional control valve is held in this position for a sufficiently long time, the pressure at the outlet port and, therefore, the effective brake pressure will be reduced to zero so that there will be no braking effect of the connected wheels.

However, in such an antiskid regulation system it is desired to bring the pressure at the outlet port of the 3-way, 2-position directional control valve and, therefore, the effective brake pressure to a certain value lying between the pressure of the fluid source and zero. But this is only possible with the known solenoid operated 3-way, 2-position directional control valve in that normally the valve spool is permanently switched from its one end position to its other end position so that the outlet port communicates either with the fluid source or with the return-reservoir connector for a very short time, respectively. In this process, fluid is fed to the slave unit or wheel brake cylinder for a very short time resulting in a rise of the pressure at the outlet port and in a consequent discharge to the return reservoir the pressure is reduced. In this process, the pressure varies permanently about the desired value.

However this above process results in a very high fluid consumption so that the fluid source has to provide fluid permanently although no more fluid would be required at the outlet port if the desired pressure value was reached. Moreover, the permanent pulsation of the effective pressure has disadvantageous effects on the slave units. In the example of the antiskid regulation system, the effective pressure pulsation leads to an intermittent braking which has an annoying effect on the vehicle occupants and can cause wrong reactions of the driver.

SUMMARY OF THE INVENTION

An object of the present invention is to provide a 3-way, 2-position directional control valve of the aforesaid type which reduces the pressure at the outlet port relative to the pressure of the fluid source proportional to the operating force of the solenoid, i.e. proportional to its energizing current, and without permanent loss of fluid.

According to this invention, this object is achieved in that the valve spool is actuated by the pressure at the outlet port in the active direction of the solenoid and in opposite direction of the pressure of the fluid source, and in that the outlet port is blocked by the, thusly, achieved intermediate position of the valve spool. Thus, it is accomplished in an advantageously simple manner that the pressure at the outlet port is reduced relative to the pressure of the fluid source by a value proportional to the magnet force. If the force at the valve spool resulting from the pressure difference between outlet port and fluid source is in a state of equilibrium with the force of the solenoid, the valve spool will be held in an intermediate position in which the outlet port is blocked. To maintain the desired pressure, no more fluid is required. If for any reasons whatsoever, the pressure of the fluid source or at the outlet port changes, the hydraulic force acting on the valve spool will come into a state of unequilibrium with the magnet force, resulting in the valve spool being shifted until the formerly prevailing pressure difference has been restored. With an alteration of the magnet force caused by the controller, the conditions of equilibrium are not fulfilled until the pressure difference newly determined by the controller has been reached.

A feature of the present invention is the provision of a solenoid operated 3-way, 2-position directional control valve comprising: a housing having a longitudinal axis; a bore disposed in the housing coaxial of the axis; a valve spool disposed in the bore coaxial of the axis; an armature controlled by a solenoid connected to one end of the housing, the armature being connected to one end of the valve spool; an outlet port extending through the wall of the housing; a fluid source inlet extending through the wall of the housing; a return-reservoir connector extending through the wall of the housing; the valve spool being associated with the outlet port, the fluid source and the connector to enable the outlet port to communicate with the fluid source in a first position of the valve spool and to enable the outlet port to communicate with the connector in a second position of the valve spool; and a first surface on one end of the valve spool adjacent the armature actuated by pressure of the fluid source to move the valve spool in a direction away from the armature and a second surface on the other end of the valve spool remote from the armature actuated by pressure at the outlet port to move the valve spool in a direction toward the armature to cause the valve spool to achieve an equilibrium position intermediate the first and second positions and block the outlet port.

Another feature of the present invention is that the valve spool has a first actuation surface distant from the solenoid with a first chamber in front of it, the first chamber communicating with the outlet port, and a second actuation surface adjacent the solenoid with a second chamber in front of it, the second chamber communicating with the fluid source. Thus, it is achieved in a most simple way that the valve spool is influenced by the pressure of the fluid source and by the pressure at the outlet port in opposite directions, respectively, with the resultant force being opposed to the active direction of the magnet without the addition of special members.

Still another feature of the present invention is that the valve spool has a pocket bore running in an axial direction, in which pocket bore a piston is disposed in a movably sealed manner. The end of the piston projects out of the valve spool and is supported at the solenoid. The pocket bore communicates with the fluid source, and the valve spool projects with its end faces into the second chamber and into the first chamber, with these two chambers being in communication with one another and with the outlet port. This has the advantage that the pressure difference occurring between fluid source and outlet port does not act on the overall cross section of the valve spool, but only on the cross section of the piston movable in the pocket bore. As the cross section of this piston has no leading edges and the like, it can have very small dimensions so that the solenoid does not have to be excessively large. This solution also has the advantage that two coaxial bores of different diameters are not necessary in one member, such bores being extremely difficult to manufacture with respect to the accuracy required for such valves.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a solenoid operated 3-way, 2-position directional control valve in accordance with the principles of the present invention.

DESCRIPTION OF THE PREFERRED EMBODIMENT

A stepped receiving bore 2 which is divided into bore sectors A, B, and C is provided in a housing 1 coaxial of the longitudinal axis of housing 1. In bore sector B, there is disposed an intermediate element 3 which is designed with circumferential annular grooves 5 and 6 which are packed by seals 4 relative to one another and relative to the rest of bore 2. Annular groove 6 communicates with a fluid source (not shown) via a fluid connector 7.

Annular groove 5 communicates with a return reservoir (not shown) via a connector 8. A central bore 9, coaxial of the longitudinal axis of housing 1, is provided in intermediate element 3, and a valve spool 10 is disposed in bore 9 in a movably sealed relation. The valve spool 10 has a pocket bore 11 into which a piston 12 is disposed adjacent a solenoid 20 disposed in housing 1. Piston 12 is connected to the bottom surface 21 of solenoid 20. The valve spool 10 has an annular groove 13 communicating permanently with annular groove 6 of intermediate element 3 via a channel 14 in any position of valve spool 10. Several recesses 15 communicating with annular groove 13 are provided at valve spool 10. Recesses 15 terminate at a leading edge 16 of valve spool 10. Leading edge 16 of valve spool 10 cooperates with a leading edge 17 of intermediate element 3 in such a way that dependent upon the position of valve spool 10, annular groove 13 is connected to or is blocked relative to a lower chamber 19 defined by bore sector C. Chamber 19 communicates with an outlet port 18 and with an upper chamber 23 adjacent the solenoid via a fluid channel 22 provided in intermediate element 3. Moreover, valve spool 10 has an annular groove 25 communicating with annular groove 5 via a channel 26. Valve spool 10 has several recesses 27 communicating with annular groove 25, recesses 27 being limited by a leading edge 28 of valve spool 10. Leading edge 28 of valve spool 10 cooperates with a leading edge 29 of intermediate element 3 in such a way that annular groove 25 communicates with or is blocked relative to upper chamber 23.

Intermediate element 3 is held in a fixed position by a retaining ring 30 which is fastened in bore sector A by screws 31. The end of valve spool 10 projecting into upper chamber 23 is firmly connected to an armature 32. In a central aperture 33 of armature 32 there is disposed a spring 34 which rests against valve spool 10, on the one hand, and against bottom surface 21 of solenoid 20, on the other hand.

Solenoid 20 is screwed into bore sector A, and upper chamber 23 is sealed to the outside by a seal 35. A normal magnetic feedback 36 disposed in bore sector A is interrupted by a ring 37 of non-magnetic material so that the magnetic flow of solenoid 20 must always flow via armature 32. On the bottom surface 21 of solenoid 20, an anti-adhesion sheet 38 is provided to enable armature 32 to be loosened from solenoid 20 after the flow energizing solenoid 20 has been interrupted.

The inventive solenoid operated 3-way, 2-position directional control valve works as follows.

Pressure fluid of a fluid source is delivered at connector 7 and arrives at pocket bore 11 of valve spool 10 via annular groove 6, channel 14, annular groove 13 and a transverse channel 39. When solenoid 20 is de-energized, valve spool 10 is in the illustrated position due to the effect of spring 34. In this position leading edges 16 and 17 do not overlap and, thus, there is fluid connection via recesses 15 between annular groove 13 and lower chamber 19 and hence to outlet port 18. Thus, fluid will flow from the fluid source to the outlet port 18 without hindrance at first so that equal pressure prevails in the whole system. This pressure acts on the bottom of pocket bore 11 of valve spool 10 and in an opposite direction on piston 12 which thereby is pressed in the direction of solenoid 20. At the same time, the pressure acts on the two ends of valve spool 10 through means of chamber 19 and upper chamber 23 via channel 22 so that the valve spool 10 is pressure-balanced as a whole and remains in the illustrated position due to the force of spring 34.

When solenoid 20 is energized, armature 32 is drawn upwards, as seen in the drawing, resulting in valve spool 10, which is firmly connected to armature 32 being shifted in a corrsponding direction. In this process, leading edges 16 and 17 overlap at first, resulting in the interruption of the connection of annular groove 13 with chamber 19. With further shifting of valve spool 10, a connection of chamber 23 with annular groove 25 is opened at leading edges 28 and 29. Thus, the outlet port 18 communicates with return-reservoir connector 8 via chamber 19, channel 22, chamber 23, annular groove 25 and channel 26. With this connection fluid flows from outlet port 18 to the return reservoir, and, thus, the pressure is reduced correspondingly.

With this reduction of pressure at outlet port 18, the pressure of the fluid source acts downwards, as seen in the drawing, in valve spool 10 on the bottom of pocket bore 11 in accordance with the surface of cross section of piston 12. The reduced pressure at the outlet port acts upwards, as seen in the drawing, in accordance with the surface of cross section of piston 12 plus the magnet force. If the pressure at the outlet port 18 has been reduced to the extent that the forces acting on valve spool 10 are balanced, i.e., that the force of the downward acting pressure of the fluid source equals the force of the upward acting pressure at the outlet port plus the magnet force, the valve spool 10, will assume an intermediate position in which the outlet port 18 neither communicates with the fluid source nor with the return-reservoir connector. In this process, a pressure is adjusted at outlet port 18, which pressure is lower than the pressure of the fluid source by a value proportional to the magnet force.

It is to be particularly noted that the above-described operation is extremely sensitive, and that, as a consequence of this sensitivity the pressure at outlet port 18 is brought very softly to the valve determined by the magnet force without pressure peaks occurring.

While we have described above the principles of our invention in connection with specific apparatus it is to be clearly understood that this description is made only by way of example and not as a limitation to the scope of our invention as set forth in the objects thereof and in the accompanying claims.

We claim:

1. A solenoid operated 3-way, 2-position directional control valve comprising:
    a housing having a longitudinal axis;
    a housing bore disposed in said housing coaxial of said axis;
    an intermediate element disposed coaxial of said axis in and sealed to said housing bore, one end of said intermediate element engaging a first inner wall of said housing bore disposed transverse to said axis;
    a retaining ring connected to a second inner wall of said housing bore disposed transverse of said axis, said retaining ring engaging the other end of said intermediate element to secure said intermediate element against motion in said housing bore;
    an intermediate element bore disposed in said intermediate element coaxial of said axis;
    a valve spool disposed in said intermediate element bore coaxial of said axis;
    an armature controlled by a solenoid connected to one end of said housing adjacent said other end of said intermediate element, said armature being connected to one end of said valve spool;
    an outlet port extending through the wall of said housing;
    a fluid source inlet extending through the wall of said housing;
    a return-reservoir connector extending through the wall of said housing;
    said valve spool being associated with said outlet port, said fluid source inlet and said connector to enable said outlet port to communicate with said fluid source inlet in a first position of said valve spool and to enable said outlet port to communicate with said connector in a second position of said valve spool;
    a first chamber disposed in said housing bore adjacent said one end of said valve spool, said first chamber being in communication with said connector;
    a second chamber disposed in said housing bore adjacent the other end of said valve spool, said second chamber being in communication with said fluid source inlet and said outlet port;
    a first channel disposed in said intermediate element parallel to and spaced from said axis to enable said first and second chambers to communicate with each other;
    a pocket bore disposed in said valve spool coaxial of said axis;
    a piston movably sealed to the inner surface of said pocket bore having one end projecting into said first chamber and connected to said solenoid;
    passageways in said intermediate element and said valve spool to enable said pocket bore to communicate with said fluid source inlet;
    said pocket bore having a bottom actuated by pressure at said fluid source inlet to move said valve spool in a direction away from said solenoid;
    said piston having the other end thereof actuated by said pressure at said fluid source inlet to move said piston in a direction toward said solenoid;
    a first surface on said one end of said valve spool disposed in said first chamber actuated by said pressure at said outlet port to move said valve spool in a direction away from said solenoid;
    a second surface on said other end of said valve spool disposed in said second chamber actuated by pressure at said outlet port to move said valve spool in a direction toward said solenoid;
    said actuation of said pocket bore bottom, said piston and said first and second surfaces and energizing said solenoid causing said valve spool to achieve an equilibrium position intermediate said first and second positions and block said outlet port;
    said intermediate element bore being defined by a first leading edge adjacent said first chamber and a second leading edge adjacent said second chamber; and
    said valve spool including
        a first annular groove permanently in communication with said connector and in communication with said first chamber past said first leading edge when said valve spool is in said second position, and
        a second annular groove permanently in communication with said fluid source inlet and in communication with said second chamber past said second leading edge when said valve spool is in said first position,
        said first and second annular grooves being blocked by an associated one of said first and second leading edges when said valve spool is in said intermediate position.

2. A valve according to claim 1, wherein said armature includes
    a central aperture coaxial of said axis, and a spring disposed in said central aperture having one end of thereof resting against the bottom surface of said solenoid and the other end thereof resting against said one end of said valve spool.

3. A valve according to claim 2, wherein said housing bore includes
a stepped receiving bore divided into three portions,
a first of said three portions having a greater diameter than a second of said three portions and said second of said three portions having a greater diameter than a third of said three portions,
said third of said three portions being connected to said outlet port,
said second of said three portions being connected to said fluid source inlet, and said connector and containing therein said intermediate element, and
said first of said three portions has said solenoid screwed therein.

4. A valve according to claim 3, wherein said intermediate element includes
a third annular groove in communication with said fluid source inlet,
a fourth annular groove in communication with said connector,
a second channel enabling communication between said first and fourth annular grooves, and
a third channel enabling communication between said second and third annular grooves.

* * * * *